United States Patent [19]

Denzin et al.

[11] Patent Number: 4,851,663

[45] Date of Patent: Jul. 25, 1989

[54] APPARATUS FOR MONITORING LETTER CLOSING DEVICES

[75] Inventors: Horst Denzin; Heinz Rehberg, both of Berlin, Fed. Rep. of Germany

[73] Assignee: Francotyp-Postalia GmbH, Berlin, Fed. Rep. of Germany

[21] Appl. No.: 148,585

[22] Filed: Jan. 26, 1988

[51] Int. Cl.[4] .................... G01N 9/04

[52] U.S. Cl. .................... 250/223 R; 271/258

[58] Field of Search .................... 250/223 R; 271/258; 209/587, 597

[56] References Cited

U.S. PATENT DOCUMENTS

| | | | |
|---|---|---|---|
| 4,113,105 | 9/1978 | DeHart et al. | 250/223 R |
| 4,362,100 | 12/1982 | Wu et al. | 271/258 |
| 4,691,100 | 9/1987 | Kizu et al. | 250/223 R |

*Primary Examiner*—David C. Nelms
*Assistant Examiner*—Khaled Shami
*Attorney, Agent, or Firm*—Herbert L. Lerner; Laurence A. Greenberg

[57] ABSTRACT

An apparatus for monitoring letter closing devices in mail handling machines in mail handling lines includes transport rollers receiving envelopes. A holding-down device is downstream of the transport rollers in envelope transport direction. A plow plate is downstream of the holding-down device. A deflector is disposed between the holding-down defice and the plow plate. A closing device is downstream of the plow plate. A relection light gate is disposed underneath the plow plate. The plow plate has a reflecting surface forming part of the reflection light gate.

12 Claims, 1 Drawing Sheet

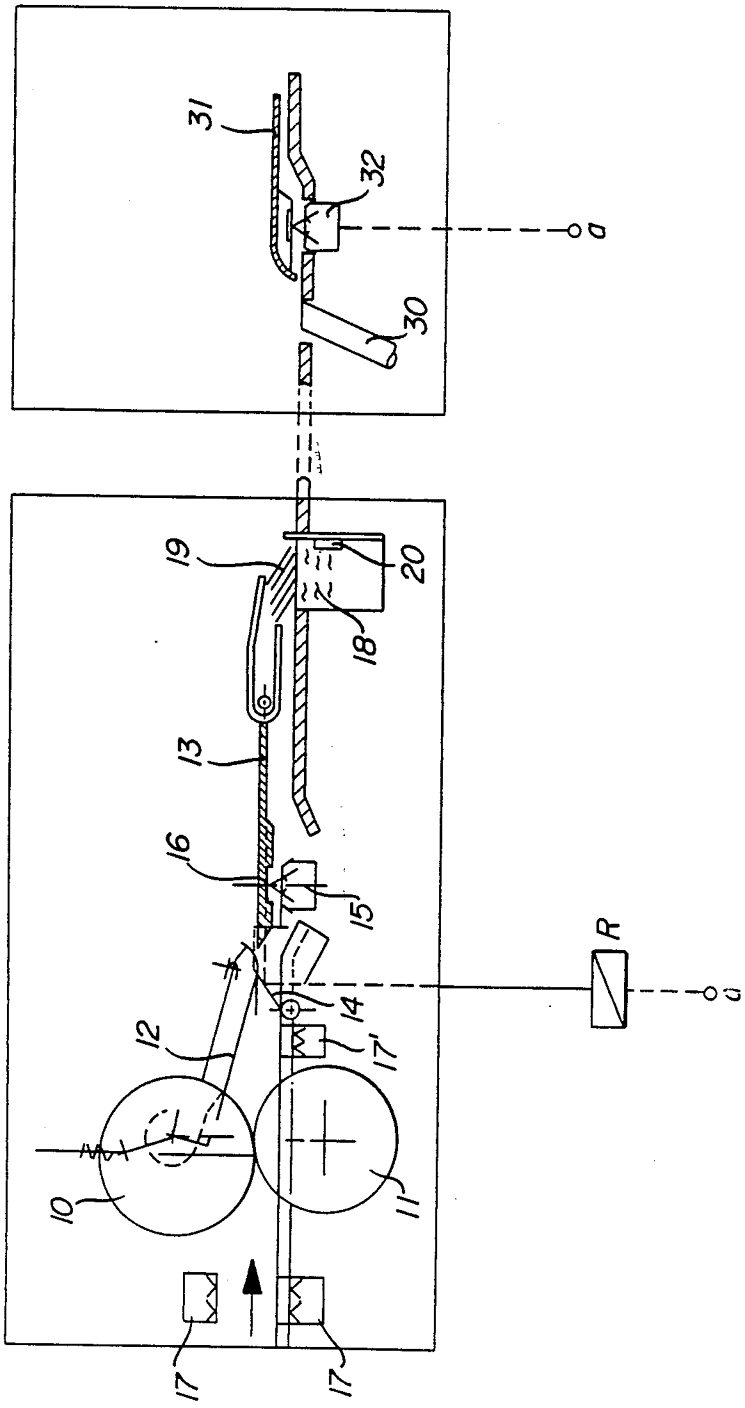
31
32
a
30
19
20
18
13
16
15
R
a
14
12
17'
10
11
17
17

APPARATUS FOR MONITORING LETTER CLOSING DEVICES

The invention relates to an apparatus for monitoring letter closing devices in mail handling machines in mail handling lines.

It is known to combine franking and inserting systems having letter closing devices in a mail handling line, in order to attain more economical mail handling as compared with manual handling. In order to keep the contents of the mail secret, such as when sending account withdrawals in the banking field, exact closure of the letters is necessary. In order to assure secure closure of the envelope, devices for lifting envelope flaps are known, which cause the envelope flap to be reliably lifted away from the envelope and delivered through a separate-feed device to a moistening device, as in U.S. Pat. Nos. 4,353,773 and 4,551,188. However, there is no particular provision for monitoring the lifting of the envelope flap from the envelope. Nor is the exact closure ascertained by a machine.

It is accordingly an object of the invention to provide an apparatus for monitoring letter closing devices, which overcomes the hereinafore-mentioned disadvantages of the heretofore-known devices of this general type and which monitors the separation of the envelope flap from the envelope and the ensuing checking of the envelope closure.

With the foregoing and other objects in view there is provided, in accordance with the invention, an apparatus for monitoring letter closing devices in mail handling machines in mail handling lines, comprising transport rollers receiving envelopes, a holding-down device downstream of the transport rollers in envelope transport direction, a plow plate downstream of the holding-down device, a deflector disposed between the holding-down device and the plow plate, a closing device downstream of the plow plate, and a reflection light gate disposed underneath the plow plate, the plow plate having a reflecting surface forming part of the reflection light gate.

In accordance with another feature of the invention, there is provided an entry light gate disposed upstream or immediately downstream of the transport rollers.

In accordance with a further feature of the invention, there is provided a closure monitoring device for monitoring envelope flaps, which is disposed at an arbitrary point in the mail handling line.

In accordance with an added feature of the invention, the deflector is pivotable into two positions for guiding envelope flaps above and below the plow plate.

In accordance with an additional feature of the invention, the reflection light gate includes means for issuing an optical signal indicating the passage of an envelope flap beneath the plow plate.

In accordance with yet another feature of the invention, the reflection light gate includes means for issuing an acoustical signal indicating a defective passage of an envelope.

In accordance with yet a further feature of the invention, the closing device has a supply container with a fill level sensor.

In accordance with yet an added feature of the invention, the closure monitoring device includes a blower and a retaining plate having another reflection light gate.

In accordance with yet an additional feature of the invention, the closure monitoring device includes a suction device and a retaining plate having another reflection light gate.

In accordance with a concomitant feature of the invention, there is provided an entry light gate in the vicinity of the transport rollers, another closure monitoring device disposed upstream of the entry light gate and controlled by cooperation of the deflectors, and an additional switch monitoring the position of the other closure monitoring device.

Other features which are considered as characteristic for the invention are set forth in the appended claims.

Although the invention is illustrated and described herein as embodied in an apparatus for monitoring letter closing devices, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the drawing.

BRIEF DESCRIPTION OF DRAWING

The drawing is a partly cross-sectional, side-elevational view of the apparatus according to the invention.

Referring now to the single FIGURE of the drawing in detail, there is seen an apparatus for lifting the envelope flaps of envelopes, in which envelopes arrive at two transport rollers 10, 11 in the direction of the arrow, such as from an inserting machine. The lower transport roller 11 serves as the drive mechanism. The upper transport roller 10 is resiliently supported, so that the spacing between the two transport rollers 10, 11 is automatically adapted when thicker envelopes or more fully filled envelopes pass through. The envelopes are carried from the transport rollers 10, 11 to a plow plate 13 by means of a holding-down device 12. A further light gate 17' is disposed downstream of the transport rollers 10, 11. A deflector 14 is disposed upstream of the plow plate 13. In the position shown, the deflector presses the envelope flap onto the envelope and guides it over the plow plate 13. The deflector 14 is pivoted into a horizonal position in order to lift the envelope flap. In this way, the envelope flaps are guided underneath the plow plate 13 to a closing device 18, 19. A reflection light gate 15, 16 is mounted on the underside of the plow plate 13 upstream of the closing device 18, 19. The reflection light gate is formed of a light emitting and receiving element 15 and a reflection surface 16 on the plow plate 13. The lifting of the envelope flaps or the sliding of the envelope flap beneath the plow plate 13 is ascertained and evaluated by means of the reflection light gate, for instance by optical and/or acoustical indication or by shutting off the feed.

In order to increase the monitoring reliability of the lifting of the envelope flaps by the plow plate 13, an entry light gate 17 is additionally mounted upstream or directly downstream of the transport rollers 10, 11. The entry light gate 17 registers each arriving envelope and is coupled to the reflection light gate 15, 16. Depending on the mutual spacing of the configuration of the two light gates, in order to ascertain the exact lifting of the envelope flap, either both light gates must be active simultaneously at some certain time, or both light gates must become active in succession within a certain period of time.

The closing device 18, 19 is formed of a supply container 18 and an applicator device 19. The supply container 18 serves to receive the moistening, gluing, solvent or adhesive agent, which in each case reaches the envelope flap by means of the applicator device 19. The applicator device 19 may, for instance, be in the form of brushes, a sponge or a spray device. A moisture sensor or a fill level sensor 20 monitors the presence of or the amount of the container filling or moisture in the container 18.

After the passage of the envelopes through the closing device 18, 19, they are closed by means of a non-illustrated pressing device. Pressing rollers, for instance, are provided as the pressing device, or optionally the passage through the franking machine is used for this purpose.

A device for closure monitoring follows the closure device and/or the franking device, if necessary. The closure monitoring device may instead be placed upstream of the entry light gate 17 or a second such device may be disposed at that location. An electro-magnetic switch or relay R permits the deflector 14 to be controlled by the light gate 32. The closure monitoring device is formed of a blower or suction device 30, a retaining plate 31 and a further reflection light gate 32. If the envelopes are firmly closed, they are displaced by the retaining plate 31. If an envelope is not closed, the envelope flap thereof passes underneath the retaining plate 31 and passes through the reflection light gate 32, so that it can be separated out by suitable provisions.

The monitoring device 30–32 can also monitor optically and/or acoustically, in combination with the entry light gate 17 as well, in order to serve as a means for monitoring envelope passage or feeding.

The deflector 14 is also controllable with the preceding entry light gate 17, and the position thereof is monitored by means of an additional switch. This may be necessary in order to shut off the monitoring function of the reflection light gate if already-closed envelopes are directed over the plow plate 13. To this end, another closure monitoring device like the device 30, 31, 32 is mounted upstream of the entry light gate 17.

We claim:

1. Apparatus for monitoring letter closing devices in mail handling machines in mail handling lines, comprising transport rollers receiving envelopes, a holding-down device downstream of said transport rollers for transporting the envelopes in envelope transport direction, a plow plate downstream of said holding-down device for receiving the envelopes from said holding-down device, a deflector disposed between said holding-down device and said plow plate for deflecting flaps of the envelopes, a closing device downstream of said plow plate for sealing the flaps to the envelopes, and a reflection light gate disposed underneath said plow plate for ascertaining deflection of the flaps, said plow plate having a reflecting surface forming part of said reflection light gate.

2. Apparatus according to claim 1, including an entry light gate disposed upstream of said transport rollers for ascertaining lifting of the flaps in conjuction with said reflection light gate.

3. Apparatus according to claim 1, including an entry light gate disposed immediately downstream of said transport rollers for ascertaining lifting of the flaps in conjunction with said reflection light gate.

4. Apparatus according to claim 1, including a closure monitoring device for monitoring whether or not the envelope flaps have been properly closed.

5. Apparatus according to claim 1, wherein said deflector is pivotable into two positions for guiding envelope flaps above and below said plow plate.

6. Apparatus according to claim 1, wherein said reflection light gate includes means for issuing an optical signal indicating the passage of an envelope flap beneath said plow plate.

7. Apparatus according to claim 1, wherein said reflection light gate includes means for issuing an acoustical signal indicating a defective passage of an envelope.

8. Apparatus according to claim 1, wherein said closing device has a supply container with a fill level sensor.

9. Apparatus according to claim 4, wherein said closure monitoring device includes a blower and a retaining plate having another reflection light gate.

10. Apparatus according to claim 4, wherein said closure monitoring device includes a suction device and a retaining plate having another reflection light gate.

11. Apparatus according to claim 9, including an entry light gate in the vicinity of said transport rollers, another closure monitoring device disposed upstream of said entry light gate and controlled by cooperation of said deflectors, and an additional switch monitoring the position of said other closure monitoring device.

12. Apparatus according to claim 10, including an entry light gate in the vicinity of said transport rollers, another closure monitoring device disposed upstream of said entry light gate and controlled by cooperation of said deflectors, and an additional switch monitoring the position of said other closure monitoring device.

* * * * *